March 17, 1959 G. FIORE 2,877,579

MULTI-DIGIT INDICATING REGISTER

Filed Aug. 16, 1954 3 Sheets-Sheet 1

INVENTOR:
GIOVANNI FIORE
BY
Richardson, David and Nordon
ATTY'S

March 17, 1959 G. FIORE 2,877,579

MULTI-DIGIT INDICATING REGISTER

Filed Aug. 16, 1954 3 Sheets-Sheet 2

INVENTOR.
GIOVANNI FIORE
BY
Richardson, David and Nordon
ATTYS.

INVENTOR:
GIOVANNI FIORE
BY
Richardson, David and Nordon
ATTY'S

United States Patent Office 2,877,579
Patented Mar. 17, 1959

2,877,579

MULTI-DIGIT INDICATING REGISTER

Giovanni Fiore, Turin, Italy

Application August 16, 1954, Serial No. 450,030
Claims priority, application Italy August 18, 1953
5 Claims. (Cl. 40—70)

In the varied fields of applied mechanics, it is often required to register and indicate successive operations of a particular mechanism as they occur.

The present invention relates to a device by which circular or radial movements of a controlling device are registered and indicated.

One application of the present invention is, for example, a mechanism by which a telephone number is registered and displayed through, for example, a viewing slot, the successive numerals or letters forming the called number being so registered and displayed through the successive operation of the conventional telephone dial and the apparatus of the present invention.

The device of the present invention generally consists of a plurality of indicia bearing wheels arranged in side by side relationship, the wheels being rotatably mounted upon a central shaft which is both a drive shaft and a driven shaft. The various movements to be measured or indicated are transmitted to the shaft and these movements may be rectilinear or circular in nature. If rectilinear, its movements must first be transformed into circular movements by known mechanical means. The central shaft is provided with a longitudinal groove which is adapted to cooperate with a pawl carried by each of the wheels, the wheels operating independently and successively in such manner that each wheel will assume a circular position corresponding to its rotation upon the central shaft.

The device is such that at the first rotation of the central shaft, the first wheel in the operating sequence of wheels moves through the same arc as the central shaft and thereafter remains stationary with respect to the shaft even when the shaft returns to its original position. When the shaft is again rotated, the next wheel will move with the shaft and then be locked in such position with respect to the shaft when the shaft is returned. This procedure is repeated for each of the wheels in a given series of wheels, such procedure thus recording the various movements imparted to the shaft. The peripheries of the various wheels are provided with indicia so that, for example, a telephone number dialed in conventional manner may be registered and displayed. Means is also provided for quickly returning the device to its starting condition.

Figure 1:
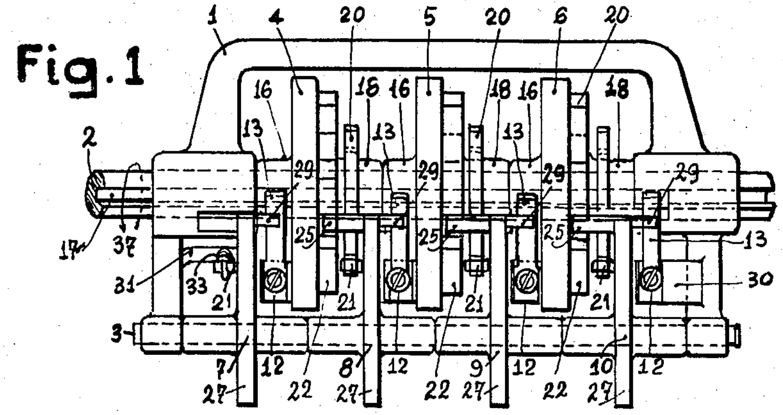
Figures 2, 3, 4, 5, 6, 7, 8, 9:
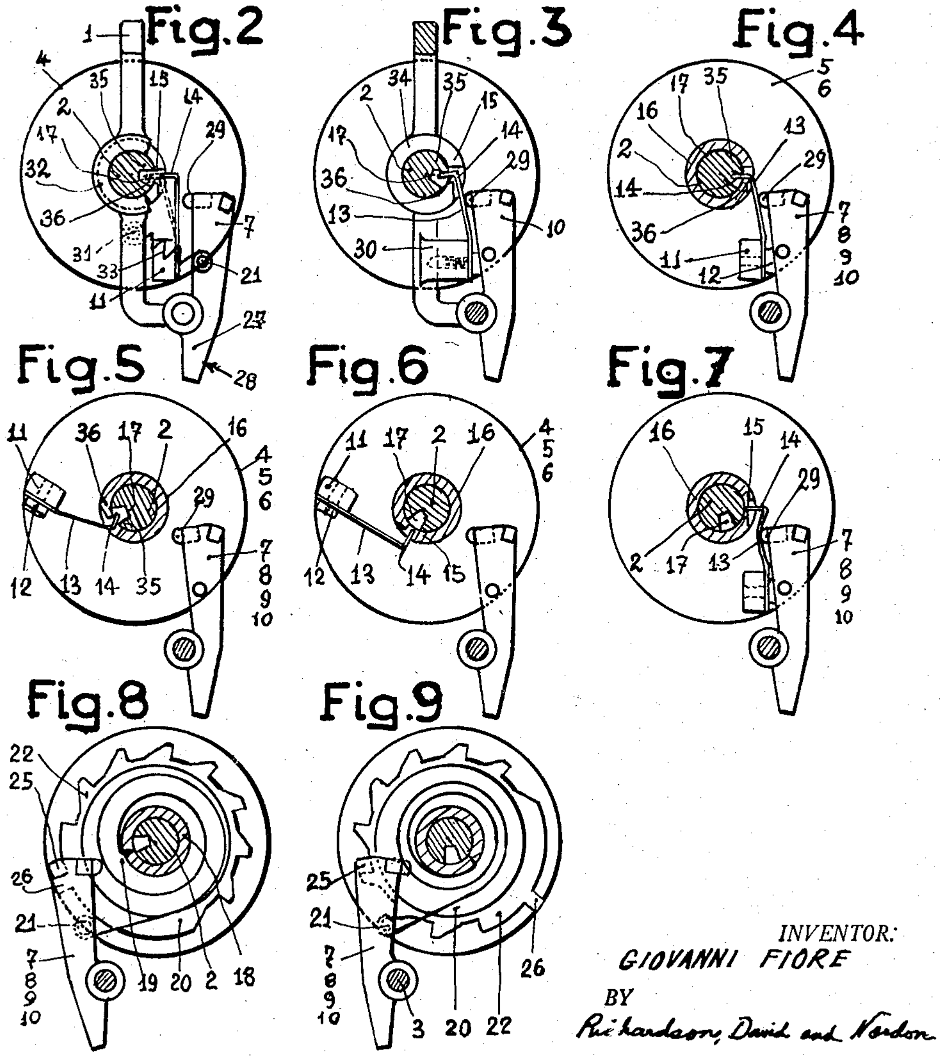
Figure 10:
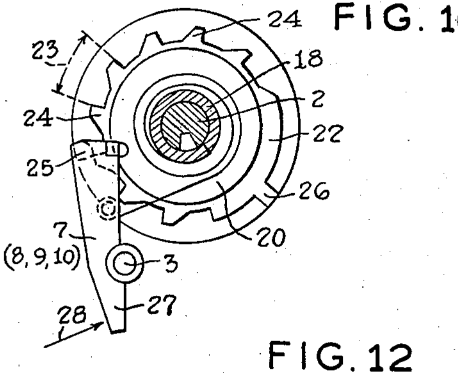
Figures 11, 13:
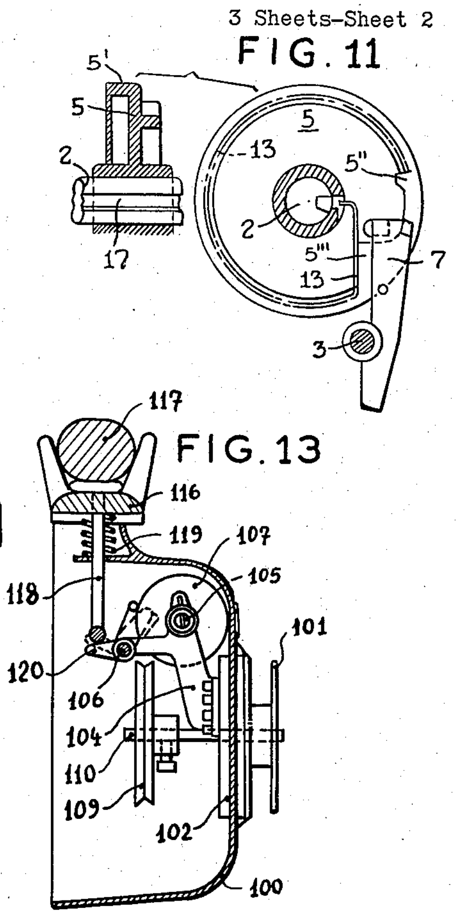
Figure 12:
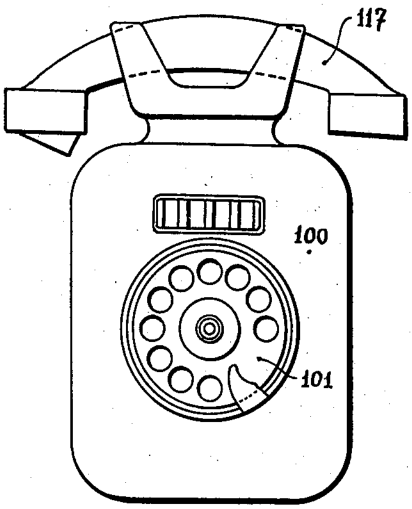
Figure 14:
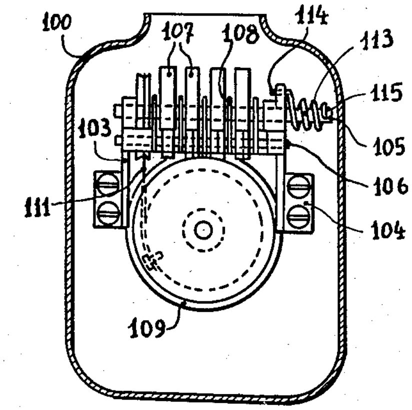
Figure 15:
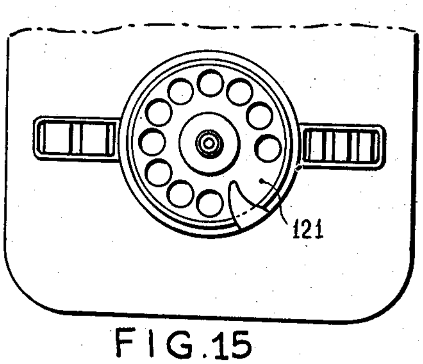
Figure 16:
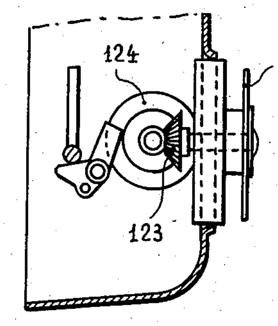
Figure 17:
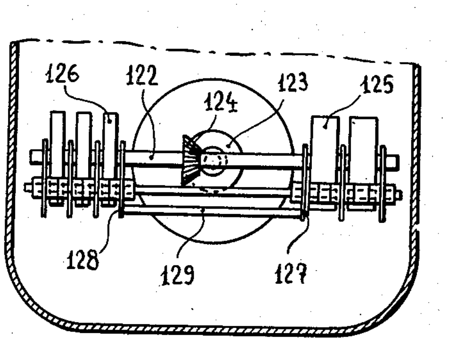
Figure 18:
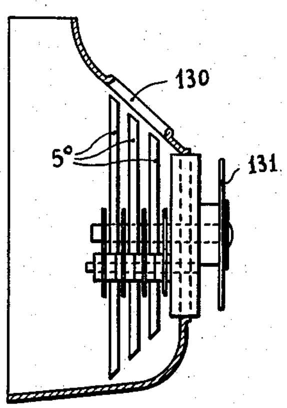
Figure 19:
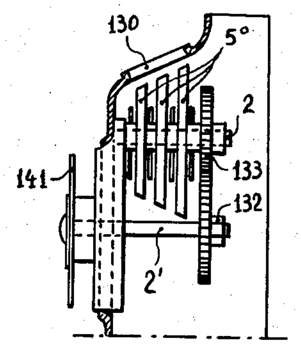

Reference is now made to the accompanying drawings, in which:

Fig. 1 is a side elevational view, partly broken away, illustrating an embodiment of the invention, Fig. 2 is an end elevational view of Fig. 1 taken from the left hand side thereof, Fig. 3 is a vertical sectional view of Fig. 1 illustrating a terminal lock device forming a part of the invention, Figs. 4 to 7, inclusive, are views similar to Fig. 3 but illustrating various positions certain pawls forming parts of the invention may assume, Figs. 8 to 10, inclusive, are views similar to Fig. 3 but taken in the opposite direction to illustrate certain phases of the operation of the invention, Fig. 11 is a view similar to Fig. 3 but illustrating a modified form the invention may assume, Fig. 12 is an elevational view of the invention as applied to a telephone apparatus, Fig. 13 is a vertical sectional view of Fig. 12, Fig. 14 is a view similar to Fig. 12 but partly broken away to illustrate certain interior mechanisms, Fig. 15 is a fragmentary elevational view of a modified form of the invention shown in Fig. 12, Fig. 16 is a vertical sectional view of Fig. 15, Fig. 17 is a view similar to Fig. 15 but partly broken away to illustrate certain interior mechanisms, Fig. 18 is a view similar to Fig. 16 but illustrating a further modified form of the invention, and Fig. 19 is a view similar to Fig. 18 but showing a modified form of the device illustrated in Fig. 18.

Referring more particularly to the drawings, there is shown therein, in Fig. 1 an inverted substantially U-shaped frame 1 having a longitudinally extending central shaft 2 journaled substantially centrally in the legs thereof and an axle 3, parallel to the shaft 2, journaled in the end portions of the legs of the frame 1. Between the legs of the frame there is rotatably mounted upon the shaft 2 a plurality of identical wheels 4, 5 and 6. Rotatably mounted upon the axle 3 is a series of levers 7, 8, 9 and 10.

On one side of each of the wheels 4, 5 and 6 there is affixed a pawl 13, the pawl 13 being affixed at one of its ends to a stud 11 by means of a screw 12, the stud 11 being affixed to the wheel and having at its free end a hook 14 adapted to engage in a groove 17 longitudinally extending in the shaft 2.

On the opposite side of each of the wheels 4, 5 and 6, as illustrated in Figs. 8 to 10, inclusive, the wheels are provided with integrally formed hub portions 18. To each of the hubs 18 a spiral spring 20 is affixed, as indicated at 19. The free end of the spring 20 is affixed, in each case, to a dog 21 carried by an adjacent arm 7, 8 or 9 as the case may be.

On that side of each of the wheels to which the spring 20 is affixed there is affixed a ratchet gear 22 the tooth pitch 24 of which (see Fig. 10) is equal to the unit of measure desired in the particular instrument.

Each of the arms 8, 9 and 10 is provided with a laterally extending dog 25 which is adapted to engage the teeth 24 of the ratchet gear 22. The lug 25 normally abuts a projection 26 extending from the ratchet gear 22, as illustrated in Fig. 8.

Each of the oscillating arms 7, 8, 9 and 10 are provided with a dependent portion 27 which may be moved by any external force, as indicated by the arrow 28 (see Figs. 2 and 10) to cause the arms to rotate upon the axle 3 to thereby disengage the stud 25 from the teeth of the ratchet gear 22. On each of the arms 7, 8, 9 and 10, on that side thereof opposite to the side carrying the dog 25, there is provided a stud 29 which is adapted to impinge upon the spring member 13 when the arm is oscillated in a counterclockwise direction as viewed, for example, in Figs. 2 to 4, inclusive.

A helical spring 33 interconnects the element 21 carried by the arm 7 with an adjacent portion of the frame 1. The spring 33 is adapted to urge the arm 7 into engagement with the spring pawl 13. At the opposite end of the frame 1 to that carrying the spring 33, there is affixed a support 30 to which is affixed an additional spring pawl 13 by means of an additional screw 12 engageable with the support 30.

When the device is ready for use, the various parts are in the position illustrated, for example, in Fig. 2. At this time it will be seen that the studs 29 are disengaged from the spring pawls 13 and that the dogs 25 are in engagement with the extensions 26, as illustrated in Fig. 8, such contact being made by the tension of the spiral spring 20. Also at this time, as illustrated in Fig. 2, it will be seen that the hook 14 of the pawl 13 is disengaged from the groove 17 in the shaft 2. At this time, also, a slot 15 in a hub portion 16 of each of the wheels is in registry with the groove 17 in the shaft 2.

To place the device in operative condition, it is only necessary to move the dependent portion 27 in a clockwise direction as viewed in Fig. 10 and against the force indicated by the arrow 28. This action causes all of the arms 7 to 10, inclusive, to move toward the centers of the wheels due to the action of the springs 20 and 33. The arms 8, 9 and 10 cannot make this movement since their dogs 25 are now in abutment with an arcuate edge portion of the ratchet gear 22 adjacent thereto. The arm 7, however, being free to oscillate on the axle 3, will thus bring its stud 29 to bear against the pawl 13 mounted upon the first wheel 4. This pawl, being elastic, is distorted thus causing the hook 14 to pass through the slot 15 and penetrate the longitudinal groove 17 in the shaft 2 as indicated in dotted lines in Fig. 2.

Having reached this preliminary position, the shaft 2 may then be rotated in the direction of the arrow 37 (Fig. 1) thus causing one edge 35 of the groove 17 to abut the hook 14 which, due to its elasticity, is bent the slight amount necessary to overcome its play in the slot 15 as a result of which it comes to rest on the face 36 thereof. The net result is that the shaft 2 continuing its rotation will drive the wheel 4 along with it. In this connection, it should be observed that the frictional resistance between the edge 35 and hook 14 and between the hook 14 and the face 36 is stronger than the stress caused by the distortion caused by the pawl 13 which would otherwise tend to disengage the hook 14 from the groove 17. As the wheel rotates, it will cause the pawl 13 to leave the stud 29 which caused it to become distorted and the rotation of the disc with the shaft 2 may not be interrupted since the hook 14 remains engaged therewith until the end of the rotary movement of the shaft 2. When the central shaft 2 begins its reverse motion to return to its original position, the frictional resistance between the edge 35, hook 14 and face 36 lessens and as a consequence the hook 14 due to the elastic reaction of the pawl 13 disengages from the groove 17 as illustrated in Fig. 6. The shaft 2, therefore, cannot in its reverse movement, carry along with it the measuring or indicating wheel 4, which wheel will thereafter remain uninfluenced by any movement of the shaft 2. Again, due to the tension acquired by the spiral spring 20 connected with the wheel 4, the stud 25 carried by the arm 8 is forced to engage the teeth 24 at a point reached by the rotation of the wheel. The stud 25 thus opposes reverse rotation of the wheel which would otherwise occur because of the tension acquired by the spring 20 as the drive shaft 2 returns to its starting position. Accordingly, the wheel 4 remains in the position reached in the original movement so that, through the medium of indicia provided upon its peripheral face, one may read an indication thereon of the amount of movement attained by the driving shaft.

At the instant in which the arm 8 moves with its stud 25 into engagement with the teeth of the wheel 4, its stud 29 comes into engagement with the pawl 13 of the following wheel 5 which, being unable to move its hook 14 into the groove 17 of the shaft 2 due to the fact that the groove 17 is still in a different radial position, becomes distorted as illustrated in Fig. 7. As soon, however, as the shaft 2 returns to its original or starting position, the groove 17 will register with the slot 15 and the hook 14 associated with the wheel 5 will snap into the groove 17, thus creating the working position above described with respect to the proceeding wheel 4. This action continues with each successive wheel.

In the device as shown in the drawings, the arrangement is such that after completion of the rotation of the last wheel 6, the arm 10, as in the preceding movements, moves radially toward the center of the driving shaft 2. Its stud 29 will then bear upon its associated pawl 13. This last-mentioned pawl, however, is fixed upon the frame 1. Consequently when the shaft 2 returns to its starting position, the edge 35 of the groove 17 distorts the hook 14 therein and brings it into contact with the face 36 of the slot 15 which, being fixed upon the frame, prevents any further movement of the drive shaft 2.

To cause the entire device or a portion thereof to return to its original working condition, it is only necessary to apply a sufficient force upon the dependent portions 27 of the arms 7 to 10, inclusive, or to selected ones thereof in the direction of the arrow 28. This causes the dog 25 to disengage from the teeth as illustrated in Fig. 10. As a result, the wheels are returned to their original positions by means of the action of the springs 20, the wheels stopping such reverse movement when the element 25 thereof comes into abutting relation with the extension 26.

In Fig. 11 there is shown a modified form of the elastic pawl 13 wherein the body of the pawl, instead of being fixed by means of the screw 12, is provided with an arcuate base held in position by the flange 5′ on the wheel 5. A tooth 5″ and a shoulder 5‴ maintain the base in fixed relation to the wheel.

The present invention finds a practical application in telephone apparatus of the automatic type for the purpose of repeating the subscriber's number as dialed, in order to make the same evident to the user. For example, telephone apparatus of the type diagrammatically illustrated in Figs. 12 to 14, wherein there is provided a case 100, a dial assembly 101 mounted therein and a casing 102 for containing the electrical controls of the dialing device, an apparatus according to the present invention may be located in the upper portion of the dial. The apparatus of the present invention is mounted, in this form of the invention, upon a pair of brackets 103 and 104 attached to the inner face of the case in such manner as to support the device so that the peripheries of the wheels may be viewed through a slot in the case 100.

In this form of the invention, a sufficient number of wheels 107 may be provided to take care of the maximum number of digits used in dialing a subscriber's number. An identical plus one of oscillating arms 108 should also be provided. A drive shaft 105, corresponding to the drive shaft 2 above described, is provided for the wheels 107. There is illustrated one means for rotating the shaft 105 when the dial 101 is operated. This consists of a grooved pulley 109 affixed to the extended axle 110 of the dial 101. The pulley 109 is connected to a pulley 112 fixed to the shaft 105. Hence, a given rotary movement of the dial 101 will impart an identical rotary movement to the shaft 105. The operation of the device in this case is identical with that described above with reference to Fig. 1, for example. Hence, as each digit of a subscriber's number is dialed upon the dial 101, it will register through the viewing window of the casing 100 until, when the entire subscriber's number has been dialed, such entire number will appear through such window.

In this form of the invention, a helical spring 113 interconnects the support 104 and the shaft 105 and acts to urge the shaft to return to its starting position after each rotation thereof.

Also, in the disclosure of Figs. 12 to 14, instead of manually resetting the device, the oscillating arms 109 are moved out of engagement by means of a projection 120 against which the lower end of a shaft 118 impinges when a hand set 117 is rested in its cradle to thus bear against the support 116 attached to the upper end of the shaft 118. When the hand set 117 is removed, a spring 119 urges the support 116 and consequently the shaft 118 in an upward direction to disengage the same from the projection 120. Thus it will be seen that a call has been completed and the hand set 117 placed in its normal position, the various wheels 107 will be returned to their starting position.

Still another form of the invention in its application to telephones is illustrated in Figs. 15 to 17, inclusive, there being provided a telephone dial 121 provided with a beveled gear 123 at its inner end. The gear 123 is enmeshed with a similar gear 124 affixed to a shaft 122 corresponding to shaft 2 in Fig. 1. Mounted indicating wheels 126 and 125 which correspond to the wheels 4, 5 and 6 illustrated in Fig. 1, are provided in this form of the invention. It will be noted that wheels 126 are separated from the wheels 125 by the diameter of the dial 121. In order to transfer movement between the arms 127 and 128 which correspond to the arms 7, 8, etc. in Fig. 1, it is only necessary to interconnect the same by means of a rod 129, the two arms so connected acting as a single arm. The device illustrated in these figures is otherwise identical to that heretofore described.

In Figs. 18 and 19 there is shown two additional modified forms for the application of the invention to dial telephone apparatus. In Fig. 18, the wheels 5 are coaxial with the dial 131 therein shown. The wheels 5° are of increasing diameter and beveled on their outer peripheries to form truncated cones. Suitable indicia is again placed upon such peripheries so that when the device is operated, the results may be viewed through a window 130 formed in the telephone casing.

In Fig. 19, there is shown a device similar to that shown in Fig. 18 with the exception that the shaft 2 is provided with a gear 133 which is enmeshed with a similar gear 132 affixed to the axle 2' of a telephone dial 141. It will be apparent that the operation of the remainder of the device is as above described.

What is claimed is:

1. An indicating register of the class described, comprising in combination: a stationary supporting frame; a main operating shaft journaled in said frame and having a longitudinally extending groove formed therein; means resiliently urging said shaft toward a predetermined normal angular position of rotation from successive angular displacements therefrom; a plurality of peripherally marked indicia bearing indicator wheels freely revolubly mounted in a row upon said shaft; individual restoring means resiliently urging each wheel toward a predetermined normal angular position of rotation; a plurality of first pawl means each carried by one of said wheels and each individually engageable in said groove when said wheel and said shaft are both in their normal positions; retaining means associated with each of said first pawl means for holding said pawl means engaged in said groove during rotation of the particular wheel by which it is carried along with said shaft; a plurality of second pawl means all carried by said frame and each disposed intermediate two adjacent ones of said wheels, each of said second pawl means being actuated by angular displacement of the wheel at one side thereof away from its normal position to prepare the first pawl means of the wheel at the other side thereof for engagement in said groove upon return of said shaft to its normal position; means for causing engagement of the first pawl means of the first of said wheels in said row; and releasable means for retaining each of said wheels in a position displaced from its normal position.

2. A register according to claim 1, further comprising locking means actuated by the last one of said wheels in said row upon displacement thereof from its normal position for preventing further displacement of said shaft from its normal position after said displacement of said last one of said wheels.

3. A register according to claim 1, wherein said first pawl means comprises an integrally formed leaf spring member having a bent free end portion which is engageable in said groove, said leaf spring member being secured at its other end to the wheel by which it is carried and being flexed intermediate its ends when prepared for engagement in said groove.

4. A register according to claim 1, wherein the peripheral surfaces of said wheels are defined by a common frusto-conical surface coaxial with said wheels; and index means for reading said indicia, said index means extending parallel to and spaced outwardly from said frusto-conical surface in a direction which would intersect said axis of rotation, if extended.

5. A register according to claim 4, further comprising a housing having a sloping wall with an elongated viewing slot formed therein, said wheels being disposed in said housing in proximity to said slot with said axis of rotation coplanar with the direction of elongation of said slot, whereby said index means is constituted by said slot, the slope of said wall being of the same angle as that of said frusto-conical surface.

References Cited in the file of this patent

UNITED STATES PATENTS

| | | |
|---|---|---|
| 1,382,224 | Pitney | June 21, 1921 |
| 1,884,663 | Greenberg | Oct. 25, 1932 |
| 1,932,965 | Greenberg | Oct. 31, 1933 |
| 1,966,118 | Greenberg | July 10, 1934 |
| 2,040,646 | Erickson | May 12, 1936 |

FOREIGN PATENTS

| | | |
|---|---|---|
| 280,004 | Great Britain | Nov. 10, 1927 |
| 470,341 | Germany | Jan. 10, 1929 |